United States Patent
Kinose

(10) Patent No.: US 7,270,112 B2
(45) Date of Patent: Sep. 18, 2007

(54) CONTROL APPARATUS FOR INTERNAL COMBUSTION ENGINE AND ENGINE SYSTEM

(75) Inventor: Kenichi Kinose, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/477,497

(22) Filed: Jun. 30, 2006

(65) Prior Publication Data
US 2007/0017484 A1    Jan. 25, 2007

(30) Foreign Application Priority Data
Jul. 25, 2005    (JP) ............................. 2005-213620

(51) Int. Cl.
*F02B 7/00* (2006.01)
(52) U.S. Cl. .................. 123/431; 123/406.47; 123/464
(58) Field of Classification Search ................ 123/431, 123/464, 295, 299, 304, 305, 446, 457, 458, 123/510, 511, 575, 479, 406.47; 73/119 A, 73/118.2; 701/103, 104, 105, 110
See application file for complete search history.

(56) References Cited

U.S. PATENT DOCUMENTS 7,128,053 B2 * 10/2006 Tokuda et al. .............. 123/429

| 2005/0109320 | A1 | 5/2005 | Mashiki |
| 2006/0016430 | A1 | 1/2006 | Sadakane et al. |
| 2006/0096577 | A1 | 5/2006 | Araki |
| 2006/0107650 | A1 | 5/2006 | Tokuda |

FOREIGN PATENT DOCUMENTS

| EP | 1 533 507 A2 | 5/2005 |
| JP | A 2001-336439 | 12/2001 |
| JP | A 2002-364409 | 12/2002 |

* cited by examiner

*Primary Examiner*—Willis R. Wolfe
*Assistant Examiner*—Johnny H. Hoang
(74) *Attorney, Agent, or Firm*—Oliff & Berridge, PLC

(57) ABSTRACT

For an internal combustion engine having an in-cylinder injector and an intake manifold injector, setting of the ratio of fuel injection (DI ratio) between these injectors is changed depending on whether the intake manifold injector is in a high temperature state or a non-high temperature state (normal state). Specifically, when the intake manifold injector is at a high temperature, the setting of the DI ratio is controlled so that the quantity of fuel to be injected from the intake manifold injector is larger than that according to setting of the fuel injection quantity in the normal state under the same engine conditions.

12 Claims, 8 Drawing Sheets

CONTROL APPARATUS FOR INTERNAL COMBUSTION ENGINE AND ENGINE SYSTEM

This nonprovisional application is based on Japanese Patent Application No. 2005-213620 filed with the Japan Patent Office on Jul. 25, 2005, the entire contents of which are hereby incorporated by reference.

BACKGROUND OF THE INVENTION

1. Field of the Invention

The present invention relates to a control apparatus for an internal combustion engine and to an engine system. In particular, the invention relates to fuel injection control for an internal combustion engine having a first fuel injection mechanism (in-cylinder injector) injecting fuel toward the inside of a cylinder and a second fuel injection mechanism (intake manifold injector) injecting fuel toward the inside of an intake manifold and/or an intake port.

2. Description of the Background Art

A configuration of an internal combustion engine is known that has both of an in-cylinder injector injecting fuel directly to a combustion chamber of the engine and an intake manifold injector injecting fuel to an intake port. A configuration is disclosed (for example in Japanese Patent Laying-Open No. 2002-364409) according to which such an internal combustion engine as described above is operated to carry out homogeneous combustion by fuel injection from the in-cylinder injector in addition to fuel injection from the intake manifold injector, for the purpose of suitably preventing the in-cylinder injector from being kept at a high temperature.

Further, Japanese Patent Laying-Open No. 2001-336439 discloses the technique of appropriately setting the ratio between the quantity of fuel to be injected into the cylinder and the quantity of fuel to be injected into the intake manifold, taking into account the state of atomization of injected fuel in the cylinder of an internal combustion engine similar to the aforementioned one.

For the internal combustion engine as described above, in order to achieve a satisfactory operating state of the engine, it is important to control setting of the fuel injection ratio between the in-cylinder injector and the intake manifold injector. Therefore, in order to appropriately operate the engine under various conditions, it is desirable to control the fuel injection ratio in consideration of not only conditions concerning the in-cylinder injector as disclosed in the above-referenced publications, but also conditions concerning the intake manifold injector.

SUMMARY OF THE INVENTION

An object of the present invention is, for an internal combustion engine including a first fuel injection mechanism injecting fuel toward the inside of a cylinder (in-cylinder injector) and a second fuel injection mechanism injecting fuel toward the inside of an intake manifold and/or an intake port (intake manifold injector), to appropriately set the fuel injection ratio between the in-cylinder injector and the intake manifold injector, in consideration of the fact that injection characteristics change as the temperature of the injector changes.

According to the present invention, a control apparatus for an internal combustion engine controls the internal combustion engine having a first fuel injection mechanism for injecting fuel into a cylinder and a second fuel injection mechanism for injecting fuel into an intake manifold. The control apparatus includes a temperature acquiring portion and a fuel injection control portion. The temperature acquiring portion acquires temperature of the second fuel injection mechanism. The fuel injection control portion controls, based on a state of the internal combustion engine, a required total quantity of fuel to be injected as well as a fuel injection ratio between a quantity of fuel to be injected from the first fuel injection mechanism and a quantity of fuel to be injected from the second fuel injection mechanism. The fuel injection control portion includes a first fuel injection ratio setting portion and a second fuel injection ratio setting portion. The first fuel injection ratio setting portion sets, when the temperature of the second fuel injection mechanism is lower than a predetermined temperature, the fuel injection ratio based on the state of the internal combustion engine. The second fuel injection ratio setting portion sets, when the temperature of the second fuel injection mechanism is at least the predetermined temperature, the fuel injection ratio based on the state of the internal combustion engine. In particular, the second fuel injection ratio setting portion sets the fuel injection ratio based on a state of the internal combustion engine so that a quantity of fuel to be injected into the intake manifold by the second fuel injection mechanism is equivalent to or higher than a quantity of fuel to be injected into the intake manifold that is determined in accordance with the fuel injection ratio which is set based on the same state of the internal combustion engine by the first fuel injection ratio setting portion.

An engine system according to the present invention includes: an internal combustion engine having a first fuel injection mechanism for injecting fuel into a cylinder and a second fuel injection mechanism for injecting fuel into an intake manifold; and a control apparatus controlling the internal combustion engine. The control apparatus acquires temperature of the second fuel injection mechanism, and controls, based on a state of the internal combustion engine, a required total quantity of fuel to be injected as well as a fuel injection ratio between a quantity of fuel to be injected from the first fuel injection mechanism and a quantity of fuel to be injected from the second fuel injection mechanism. Further, the control apparatus sets the fuel injection ratio based on a state of the internal combustion engine, when the temperature of the second fuel injection mechanism is equal to or higher than a predetermined temperature, so that a quantity of fuel to be injected into the intake manifold by the second fuel injection mechanism is equivalent to or higher than a quantity of fuel that is to be injected into the intake manifold and that is determined in accordance with the fuel injection ratio which is set based on the same state of the internal combustion engine when the temperature of the second fuel injection mechanism is lower than the predetermined temperature.

The above-described control apparatus for the internal combustion engine controls fuel injection, when the second fuel injection mechanism (intake manifold injector) has a high temperature, so that the ratio of fuel injection from the second fuel injection mechanism is relatively higher than that in a normal state (the second fuel injection mechanism is in a non-high temperature state). Accordingly, the fuel injection ratio between these fuel injection mechanisms can be set to avoid injection of a smaller quantity of fuel due to a marked error in injection quantity (deficient with respect to the set quantity) when the second fuel injection mechanism has a high temperature. Thus, occurrence can be prevented of output variation of the internal combustion engine due to the error in quantity of injected fuel when the second fuel injection mechanism has a high temperature.

Preferably, regarding the control apparatus for the internal combustion engine according to the present invention, the second fuel injection ratio setting portion sets the fuel injection ratio so that a ratio (r) of fuel injection by the second fuel injection mechanism is larger than a predetermined value.

Regarding the control apparatus for the internal combustion engine as described above, when the second fuel injection mechanism (intake manifold injector) has a high temperature, measures are taken to ensure that the ratio of fuel injection by the second fuel injection mechanism is at least a predetermined value in the shared injection region. Thus, for the second fuel injection mechanism, injection of a smaller quantity of fuel due to a marked error in injection quantity (deficient with respect to the set quantity) at a high temperature can be avoided.

Still preferably, regarding the control apparatus for the internal combustion engine according to the present invention, the second fuel injection ratio setting portion sets the fuel injection ratio so that the quantity of fuel to be injected from the second fuel injection mechanism is larger than a predetermined quantity.

Regarding the control apparatus for the internal combustion engine as described above, when the second fuel injection mechanism (intake manifold injector) has a high temperature, measures are taken to ensure that the quantity of fuel to be injected by the second fuel injection mechanism is at least a predetermined quantity in the shared injection region. Thus, for the second fuel injection mechanism, injection of a smaller quantity of fuel due to a marked error in injection quantity (deficient with respect to the set quantity) at a high temperature can be avoided.

Still preferably, regarding the control apparatus for the internal combustion engine, for a region (shared injection region) corresponding to a state of the internal combustion engine where fuel is injected by means of both of the first and second fuel injection mechanisms, a minimum value of a ratio of fuel injection by the second fuel injection mechanism that is determined in accordance with the fuel injection ratio which is set by the second fuel injection ratio setting portion is larger than a minimum value of a ratio of fuel injection by the second fuel injection mechanism that is determined in accordance with the fuel injection ratio which is set by the first fuel injection ratio setting portion.

Regarding the control apparatus for the internal combustion engine as described above, the fuel injection ratio in the shared injection region is set so that a minimum value of the ratio of fuel injection by the second fuel injection mechanism (intake manifold injector) at a high temperature is larger than the one in the normal state (in a non-high temperature state of the second fuel injection mechanism). Thus, for the second fuel injection mechanism, injection of a smaller quantity of fuel due to a marked error in injection quantity (deficient with respect to the set quantity) at a high temperature can be avoided.

A control apparatus for an internal combustion engine with another configuration of the present invention controls the internal combustion engine having a first fuel injection mechanism for injecting fuel into a cylinder and a second fuel injection mechanism for injecting fuel into an intake manifold. The control apparatus includes a temperature acquiring portion, a first fuel injection control portion and a second fuel injection control portion. The temperature acquiring portion acquires temperature of the second fuel injection mechanism. The first fuel injection control portion controls, based on a state of the internal combustion engine, a required total quantity of fuel to be injected as well as a fuel injection ratio between a quantity of fuel to be injected from the first fuel injection mechanism and a quantity of fuel to be injected from the second fuel injection mechanism. The second fuel injection control portion controls the fuel injection ratio so that the total quantity of fuel to be injected is injected from the first fuel injection mechanism, when the temperature of the second fuel injection mechanism is at least a predetermined temperature and the internal combustion engine is in a region of an operation state where a quantity of fuel that is to be injected from the second fuel injection mechanism and that is set by the first fuel injection control portion is at most a predetermined quantity.

An engine system with another configuration of the present invention includes: an internal combustion engine having a first fuel injection mechanism for injecting fuel into a cylinder and a second fuel injection mechanism for injecting fuel into an intake manifold; and a control apparatus controlling the internal combustion engine. The control apparatus acquires temperature of the second fuel injection mechanism, and controls, based on a state of the internal combustion engine, a required total quantity of fuel to be injected as well as a fuel injection ratio between a quantity of fuel to be injected from the first fuel injection mechanism and a quantity of fuel to be injected from the second fuel injection mechanism. The control apparatus further controls the fuel injection ratio so that the total quantity of fuel to be injected is injected from the first fuel injection mechanism when the temperature of the second fuel injection mechanism is at least a predetermined temperature, under the condition that the internal combustion engine is in a region of an operating state where a quantity of fuel to be injected from the second fuel injection mechanism is at most a predetermined quantity when the temperature of the second fuel injection mechanism is lower than the predetermined temperature.

Regarding the control apparatus for the internal combustion engine as described above, in the case where a very small quantity of fuel is injected from the second fuel injection mechanism (intake manifold injector) when the second fuel injection mechanism has a high temperature, the fuel injection ratio (DI ratio) is set so that the total quantity of fuel is injected from the first fuel injection mechanism (in-cylinder injector). Thus, for the second fuel injection mechanism, injection of a smaller quantity of fuel due to a marked error in injection quantity (deficient with respect to the set quantity) when the second fuel injection mechanism has a high temperature can be avoided. Accordingly, occurrence of variation in output of the internal combustion engine due to an error in fuel injection quantity can be prevented.

Thus, a chief advantage of the present invention is as follows. In the internal combustion engine having the first fuel injection mechanism injecting fuel toward the inside of a cylinder (in-cylinder injector) and the second fuel injection mechanism injecting fuel toward the inside of an intake manifold and/or an intake port (intake manifold injector), the fuel injection ratio is appropriately set so that an error in fuel injection is unlikely to occur even when the temperature of the intake manifold injector increases, and thus the operation state of the internal combustion engine can suitably be maintained.

The foregoing and other objects, features, aspects and advantages of the present invention will become more

DESCRIPTION OF THE PREFERRED EMBODIMENTS

Figure 1:
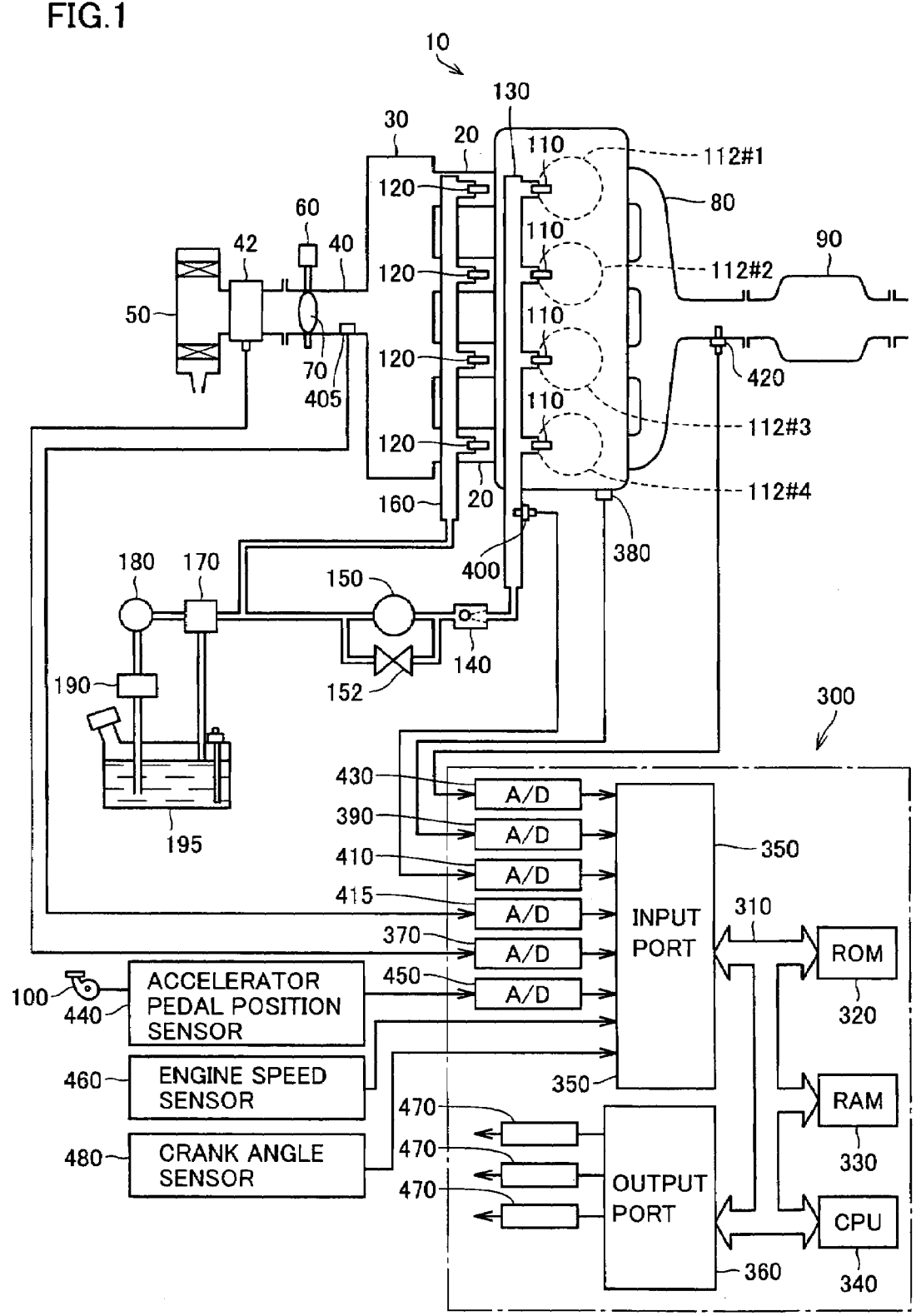
FIG. 1 is a schematic diagram of a configuration of an engine system controlled by a control apparatus for an internal combustion engine according to an embodiment of the present invention.

In the following, an embodiment of the present invention will be described in detail with reference to the drawings. It is noted that like or corresponding components in the drawings will be denoted by like reference characters and a detailed description thereof will not be repeated.

FIG. 1 shows a schematic diagram of a configuration of an engine system controlled by an engine ECU (Electronic Control Unit) that corresponds to a control apparatus for an internal combustion engine according to the embodiment of the present invention. While FIG. 1 shows, as an engine, an in-line four-cylinder gasoline engine, the present invention is not limited to such an engine.

As shown in FIG. 1, engine (internal combustion engine) 10 includes a plurality of cylinders 112#1 to 112#4. In the following, cylinders 112#1 to 112#4 will be simply referred to as "cylinder 112" or "each cylinder 112" in the case where they are to be represented generically without discrimination therebetween.

Each cylinder 112 is connected to a common surge tank 30 via a corresponding intake manifold 20. Surge tank 30 is connected to an air cleaner 50 via an intake duct 40. In intake duct 40, an air flow meter 42 and a throttle valve 70 driven by an electric motor 60 are disposed. Throttle valve 70 has its opening controlled based on an output signal of engine ECU 300, independently of an accelerator pedal 100. Each cylinder 112 is coupled to a common exhaust manifold 80. Exhaust manifold 80 is coupled to a three-way catalytic converter 90.

Each cylinder 112 is provided with an in-cylinder injector 110 for injecting fuel toward the inside of the cylinder, and an intake manifold injector 120 for injecting fuel toward the inside of an intake port and/or an intake manifold. Injectors 110 and 120 are each controlled based on an output signal of engine ECU 300.

As shown in FIG. 1, each in-cylinder injector 110 is connected to a common fuel delivery pipe 130. Fuel delivery pipe 130 is connected to an engine-driven high-pressure fuel pump 150 via a check valve 140 that permits a flow toward fuel delivery pipe 130. The discharge side of high-pressure fuel pump 150 is coupled to the intake side of high-pressure fuel pump 150 via an electromagnetic spill valve 152. As the opening of electromagnetic spill valve 152 is smaller, a greater quantity of fuel is supplied from high-pressure fuel pump 150 into fuel delivery pipe 130. When electromagnetic spill valve 152 is fully opened, fuel supply from high-pressure fuel pump 150 to fuel delivery pipe 130 is stopped. Electromagnetic spill valve 152 is controlled based on an output signal of engine ECU 300.

Each intake manifold injector 120 is connected to a common fuel delivery pipe 160 of the low-pressure side. Fuel delivery pipe 160 and high-pressure fuel pump 150 are connected to a low-pressure fuel pump 180 of electric-motor-driven type via a common fuel pressure regulator 170. Low-pressure fuel pump 180 is connected to a fuel tank 195 via a fuel filter 190. Fuel pressure regulator 170 is configured to return a portion of the fuel discharged from low-pressure fuel pump 180 to fuel tank 195 when the pressure of the fuel discharged from low-pressure fuel pump 180 becomes higher than a predetermined set pressure. Accordingly, the pressure of the fuel supplied to intake manifold injector 120 and the pressure of the fuel supplied to high-pressure fuel pump 150 are prevented from becoming higher than the set fuel pressure.

Engine ECU 300 is configured with a digital computer, including a ROM (Read Only Memory) 320, a RAM (Random Access Memory) 330, a CPU (Central Processing Unit) 340, an input port 350, and an output port 360, connected to each other via a bidirectional bus 310.

Air flow meter 42 generates an output voltage in proportion to a quantity of intake air. The output voltage of air flow meter 42 is applied to input port 350 via an A/D converter 370. To engine 10, a coolant temperature sensor 380 generating an output voltage in proportion to the engine coolant temperature is attached. The output voltage of coolant temperature sensor 380 is applied to input port 350 via an A/D converter 390.

To fuel delivery pipe 130, a fuel pressure sensor 400 generating an output voltage in proportion to the fuel pressure in fuel delivery pipe 130 is attached. The output voltage of fuel pressure sensor 400 is applied to input port 350 via an A/D converter 410. To exhaust manifold 80 located upstream of three-way catalytic converter 90, an air-fuel ratio sensor 420 generating an output voltage in proportion to the oxygen concentration in the exhaust gas is attached. The output voltage of air-fuel ratio sensor 420 is applied to input port 350 via an A/D converter 430.

Air-fuel ratio sensor 420 in the engine system of the present embodiment is a full-range air-fuel ratio sensor (linear air-fuel ratio sensor) generating an output voltage in proportion to the air-fuel ratio of the air-fuel mixture burned by engine 10. Air-fuel ratio sensor 420 may be an $O_2$ sensor that detects, in an ON/OFF manner, whether the air-fuel ratio of the air-fuel mixture burned by engine 10 is rich or lean with respect to the stoichiometric ratio.

Accelerator pedal 100 is connected to an accelerator pedal position sensor 440 generating an output voltage in proportion to the pedal position of accelerator pedal 100. The output voltage of accelerator pedal position sensor 440 is applied to input port 350 via an A/D converter 450. An engine speed sensor 460 generating an output pulse representing the engine speed is connected to input port 350. ROM 320 of engine ECU 300 stores such values as a value of the quantity of fuel to be injected (i.e. required total fuel injection quantity) that is set in association with an operating state based on the engine load factor and the engine speed obtained by accelerator pedal position sensor 440 and engine speed sensor 460 as described above, and a correction value based on the engine coolant temperature. The stored values are mapped in advance.

An air temperature sensor 405 is provided at any of the channels leading to intake manifold 20, surge tank 30 and intake duct 40. Air temperature sensor 405 generates an output voltage according to the temperature of the intake air. The output voltage of air temperature sensor 405 is applied to intake port 350 via an A/D converter 415.

A crank angle sensor 480 is configured to include a rotor attached to the crankshaft of engine 10, and an electromagnetic pickup provided in the vicinity of the rotor to detect passage of a projection provided at the outer circumference of the rotor. Crank angle sensor 480 functions to detect the rotation phase of the crankshaft. The output of crank angle sensor 480 is applied to input port 350 as a pulse signal generated at every passage of the projection.

Engine ECU 300 generates various control signals to control the entire operation of the engine system based on signals from respective sensors by execution of a predetermined program. These control signals are transmitted via output port 360 and drive circuits 470 to the group of devices and circuits constituting the engine system.

In engine 10 of the embodiment of the present invention, both of in-cylinder injector 110 and intake manifold injector 120 are provided to each cylinder 112. Therefore, with respect to a required total fuel injection quantity calculated as set forth above, fuel injection performed in a shared manner by in-cylinder injector 110 and intake manifold injector 120 must be controlled.

In the following, the fuel injection ratio between the in-cylinder injector and the intake manifold injector is represented using "DI ratio r" that is the ratio of the quantity of fuel to be injected from in-cylinder injector 110 to the total quantity of fuel to be injected. Namely, "DI ratio r=100%" means that fuel is injected from in-cylinder injector 110 only, and "DI ratio r=0%" means that fuel is injected from intake manifold injector 120 only. "DI ratio r ≠0%," "DI ratio r ≠100%" and "0%<DI ratio r<100%" each means that fuel is injected in a shared manner from in-cylinder injector 110 and intake manifold injector 120. It is noted that in-cylinder injector 110 can contribute to enhancement of the output performance by improvement of the anti-knock performance by the effect of the latent heat of vaporization. Further, intake manifold injector 120 can contribute to enhancement of the output performance by suppressing rotation (torque) variation by the effect of improvement in homogeneous state of the air-fuel mixture.

Figure 2:
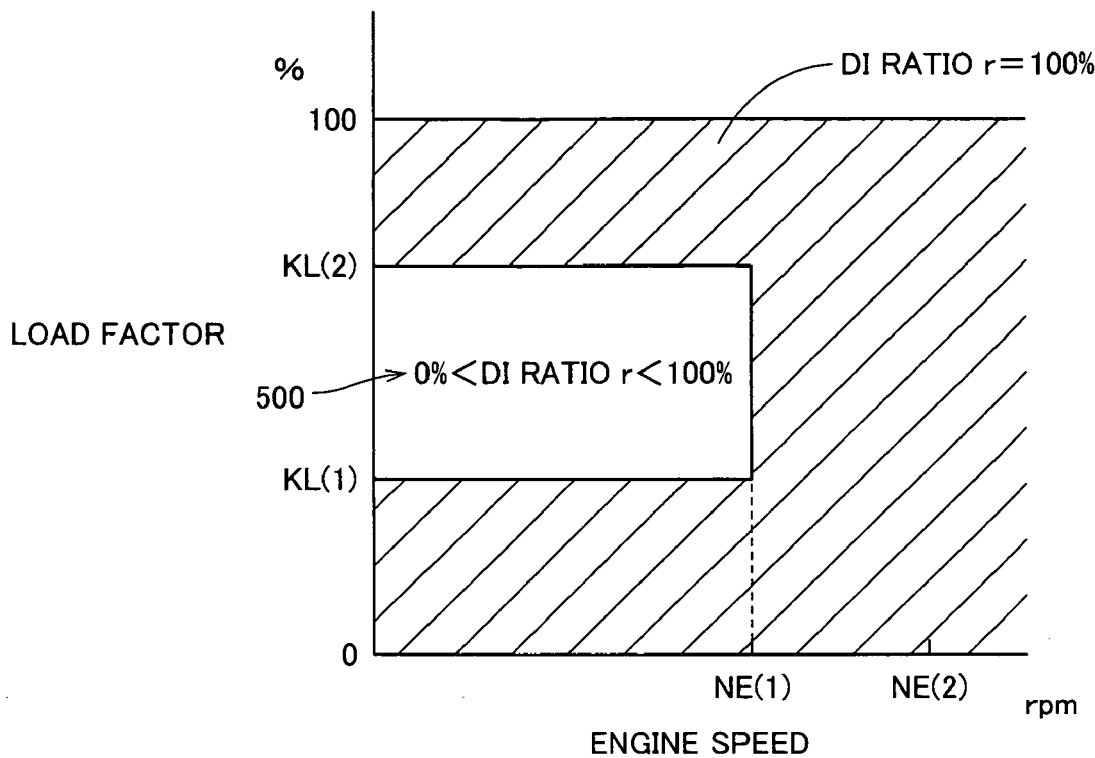
FIG. 2 illustrates an example of a DI ratio setting map (engine warming time) for a normal state of the engine system shown in FIG. 1.
Figure 3:
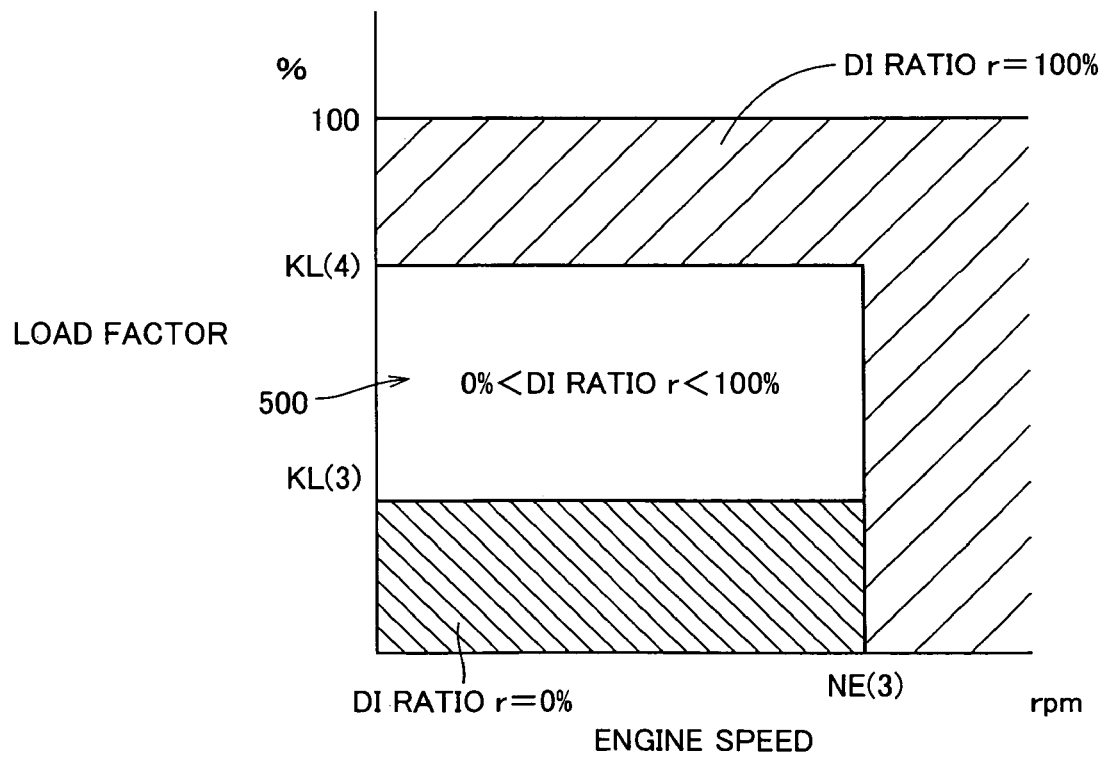
FIG. 3 illustrates an example of a DI ratio setting map (engine cooling time) for a normal state of the engine system shown in FIG. 1.

FIGS. 2 and 3 each illustrate a basic DI ratio setting map for the engine system shown in FIG. 1.

The maps shown in FIGS. 2 and 3 are stored in ROM 320 of engine ECU 300. FIG. 2 is the map for a warm state of engine 10, and FIG. 3 is the map for a cold state of engine 10.

As shown in the maps of FIGS. 2 and 3, the fuel injection ratio of in-cylinder injector 110 is expressed in percentage as DI RATIO r, and the engine speed and the load factor of engine 10 are plotted respectively along the horizontal axis and the vertical axis.

As shown in FIGS. 2 and 3, the DI ratio r is defined for each operation region that is determined by the engine speed and the load factor of engine 10, separately for respective maps for the warm state and the cold state of the engine. The maps used here are set to indicate different control regions for in-cylinder injector 110 and intake manifold injector 120 for different temperatures of engine 10. When the temperature of engine 10 detected is equal to or higher than a predetermined temperature threshold value, the map for the warm state shown in FIG. 2 is selected; otherwise, the map for the cold state shown in FIG. 3 is selected. In accordance with the selected map, in-cylinder injector 110 and/or intake manifold injector 120 are/is controlled based on the engine speed and the load factor of engine 10.

The engine speed and the load factor of engine 10 as set in FIGS. 2 and 3 will now be described. In FIG. 2, NE(1) is set to 2500 rpm to 2700 rpm, KL(1) is set to 30% to 50%, and KL(2) is set to 60% to 90%. In FIG. 3, NE(3) is set to 2900 rpm to 3100 rpm. That is, there is the relation NE(1)<NE(3). NE(2) in FIG. 2 as well as KL(3) and KL(4) in FIG. 3 are also set appropriately.

From a comparison between FIG. 2 and FIG. 3, it is seen that NE(3) of the map for the cold state shown in FIG. 3 is greater than NE(1) of the map for the warm state shown in FIG. 2. This shows that, as the temperature of engine 10 is lower, the control region of intake manifold injector 120 is expanded to include a region of higher engine speed. That is, when engine 10 is in a cold state, deposits are unlikely to accumulate in the injection hole of in-cylinder injector 110 (even if fuel is not injected from in-cylinder injector 110). Thus, the control region for injecting fuel by means of intake manifold injector 120 can be expanded to improve homogeneity.

From a comparison between FIG. 2 and FIG. 3, it is also seen that "DI RATIO r=100%" in the region where the engine speed of engine 10 is NE(1) or higher in the map for the warm state, and in the region where the engine speed is NE(3) or higher in the map for the cold state. In terms of the load factor, "DI RATIO r=100%" in the region where the load factor is KL(2) or greater in the map for the warm state, and in the region where the load factor is KL(4) or greater in the map for the cold state. This means that in-cylinder injector 110 alone is used in the region of a predetermined high engine speed, and in the region of a predetermined high engine load. That is, in the high speed region and the high load region, even if fuel injection is carried out through in-cylinder injector 110 alone, the engine speed and the load of engine 10 are so high and the intake air quantity is so large that a homogeneous air-fuel mixture can be obtained easily by using only in-cylinder injector 110. In this manner, the fuel injected from in-cylinder injector 110 is vaporized in the combustion chamber involving latent heat of vaporization (absorbing heat from the combustion chamber). Thus, the temperature of the air-fuel mixture is decreased at the compression end, so that the anti-knock performance is improved. Further, since the temperature in the combustion chamber is decreased, intake efficiency is improved and high power can be provided.

In the map for the warm state shown in FIG. 2, only in-cylinder injector 110 is used when the load factor is KL(1) or smaller. This shows that in-cylinder injector 110 alone is used in a predetermined low-load region when the temperature of engine 10 is high. When engine 10 is in the warm state, deposits are likely to accumulate in the injection hole of in-cylinder injector 110. However, when fuel is injected by using in-cylinder injector 110, the temperature of the injection hole can be lowered, in which case accumulation of deposits is prevented. Further, clogging of in-cylinder injector 110 may be prevented while ensuring the minimum fuel injection quantity thereof. Thus, in-cylinder injector 110 solely is used in the relevant region.

From a comparison between FIG. 2 and FIG. 3, it is further seen that the region of "DI RATIO r=0%" is present only in the map for the cold state of FIG. 3. This shows that fuel injection is carried out through intake manifold injector 120 alone in a predetermined low-load region (KL(3) or less) when the temperature of engine 10 is low. When engine 10 is cold and low in load and the intake air quantity is small, the fuel is less susceptible to atomization. For such a region, it is difficult to ensure favorable combustion with the fuel injection from in-cylinder injector 110. Further, particularly for the low-load and low-speed region, high power using in-cylinder injector 110 is unnecessary. Accordingly, for such a region, fuel injection is carried out through intake manifold injector 120 alone, without using in-cylinder injector 110.

Further, in the case of an operation other than the normal operation, or, in the case of catalyst warm-up during idling of engine 10 (abnormal operation state), in-cylinder injector 110 is controlled such that stratified charge combustion is effected. By causing the stratified charge combustion only during the catalyst warm-up operation, warming up of the catalyst is promoted to improve exhaust emission.

Here, characteristics are considered of an error in quantity of injected fuel due to temperature characteristics of intake manifold injector 120. When intake manifold injector 120 has a high temperature, because of such a factor as reduction of the injection-hole area due to boiling of fuel near the injection hole or such a factor as increase of the current rise time constant (ineffective injection period) due to increase in electrical resistance of the coil, the quantity of fuel injected from intake manifold injector 120 could be smaller than a set quantity of fuel to be injected. Such an error in fuel injection quantity is large in the case where the valve-opened time is short and a set quantity of fuel to be injected itself is small.

Thus, the fuel injection control according to the present embodiment sets the DI ratio as described below, based on the basic DI ratio setting maps shown in FIGS. 2 and 3, so as to avoid injection of a smaller quantity of fuel at a high temperature at which a marked error in fuel injection quantity (deficient with respect to the set quantity) of intake manifold injector 120 occurs.

Figure 4:
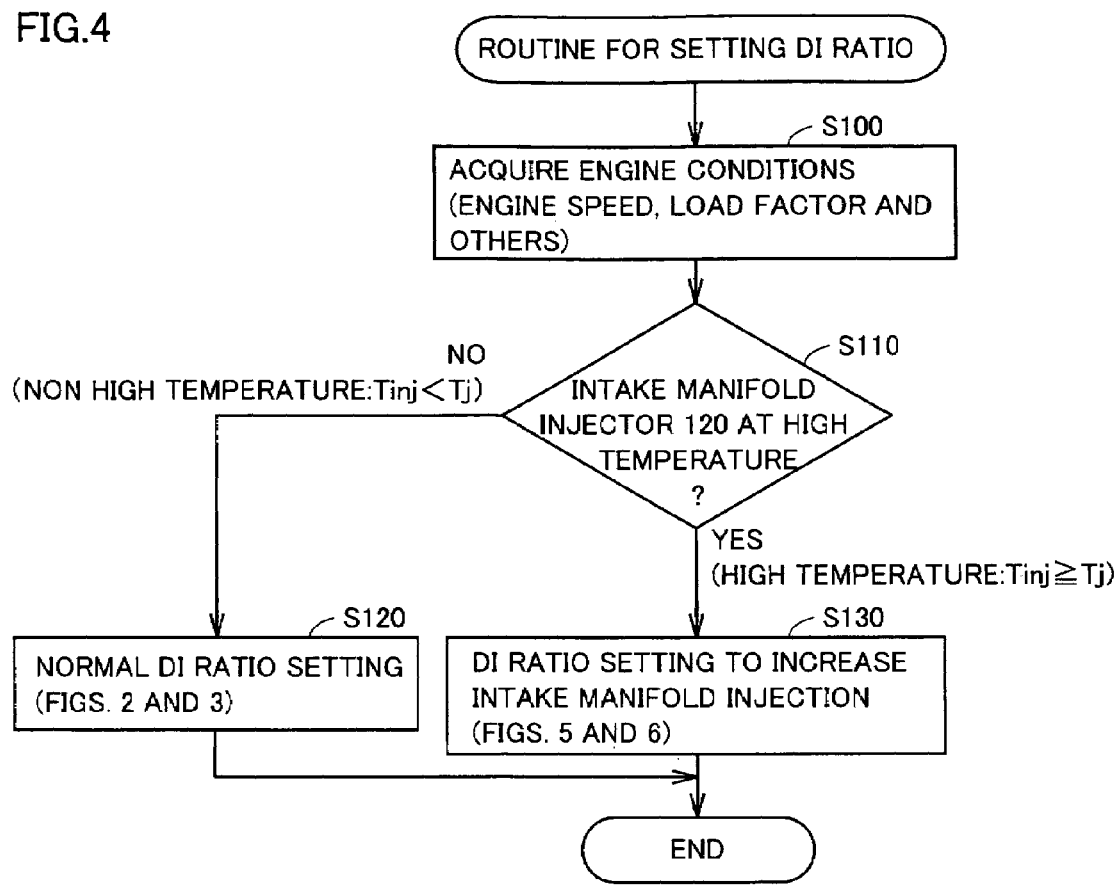
FIG. 4 is a flowchart illustrating control of DI ratio setting by the control apparatus for the internal combustion engine according to the embodiment of the present invention.

Referring to FIG. 4, in step S100, engine ECU 300 acquires conditions of engine 10 (for example, load factor, engine speed and coolant temperature). Further, in step S110, engine ECU 300 determines whether or not intake manifold injector 120 has a high temperature. The temperature of intake manifold injector 120 is detected for example by using, as parameters, fuel injection quantity, engine speed NE, load, fuel temperature, DI ratio, and intake air temperature for example. In step S110, the detected injector temperature Tinj is compared with a criterion temperature Tj.

In the case where there is the relation Tinj<Tj, engine ECU 300 determines that intake manifold injector 120 is in a normal state (non-high-temperature state) and, in step S120, sets the DI ratio in a normal manner. Specifically, based on the engine conditions acquired in step S100, the DI ratio is set according to the basic maps shown in FIGS. 2 and 3.

In contrast, in the case where there is the relation Tinj≧Tj, engine ECU 300 determines that intake manifold injector 120 is in a high-temperature state and, in step S130, sets the DI ratio so that the intake manifold injection is increased as compared with the normal one. Specifically, based on the engine conditions acquired in step S100, the DI ratio is set according to the maps for high temperature as shown in FIGS. 5 and 6.

Figure 5:
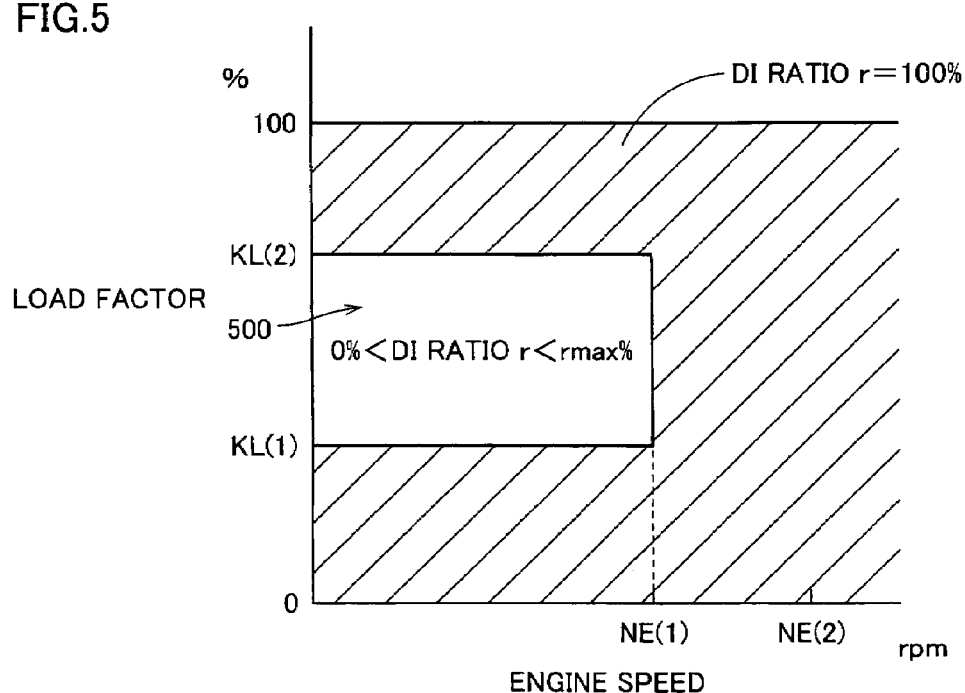
FIG. 5 illustrates an example of a DI ratio setting map (engine warming time), corresponding to FIG. 2, used when an intake manifold injector has a high temperature.
Figure 6:
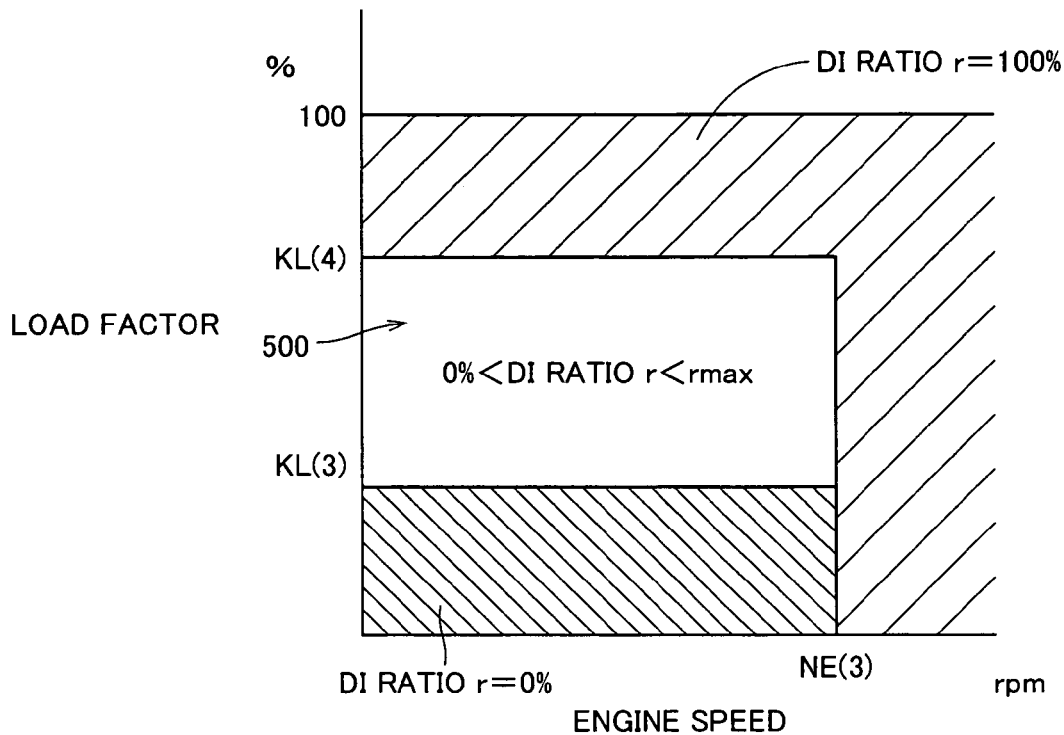
FIG. 6 illustrates an example of a DI ratio setting map (engine cooling time), corresponding to FIG. 3, used when the intake manifold injector has a high temperature.

The maps shown in FIGS. 5 and 6 correspond respectively to the DI ratio setting maps for the normal state as shown in FIGS. 2 and 3. Namely, the map shown in FIG. 5 is used when intake manifold injector 120 has a high temperature and the engine is in the warm state, and the map shown in FIG. 6 is used when intake manifold injector 120 has a high temperature and the engine is in the cold state.

In the map for high temperature shown in FIG. 5 as well, the region where "DI ratio r=100%" and the region where "DI ratio r ≠0%, 100%" and thus fuel injection is shared by both injectors 110 and 120 at a certain ratio therebetween (this region is hereinafter referred to as shared-injection region) 500 are set similarly to the normal-state map shown in FIG. 2, based on the engine speed and the engine load factor. In the map for high temperature shown in FIG. 5, the DI ratio r at each point in shared-injection region 500 is set to be equal to or lower than the DI ratio r at the same, namely corresponding point in the map for the normal state in FIG. 2 (namely to allow the ratio of injection by the intake manifold injector to be equivalent to or higher than the corresponding one in the normal state).

Similarly, in the map for high temperature shown in FIG. 6 as well, the region where "DI ratio r=0%," the region where "DI ratio r=100%" and the region where "DI ratio # 0%, 100%" which is injection-shared region 500 by both injectors 110, 120 are set, based on the engine speed and the engine load factor, in a similar manner to that for the normal-state map as shown in FIG. 3. It should be noted that, in the map for high temperature shown in FIG. 6, the DI ratio r at each point in injection-shared region 500 is set to be equal to or lower than the DI ratio at the same, namely corresponding point in the normal-state map shown in FIG. 3.

Thus, under similar engine conditions (coolant temperature, engine speed and load factor in the present embodiment), the DI ratio r that is set according to the maps for high temperature as shown in FIGS. 5 and 6 is equal to or lower than the DI ratio that is set according to the maps for the normal state as shown in FIGS. 2 and 3. In other words, under similar engine conditions, when intake manifold injector 120 is at a high temperature, engine ECU 300 sets the fuel injection ratio of intake manifold injector 120 to be equivalent to or higher than the fuel injection ratio of the intake manifold injector in the normal state (namely intake manifold injector 120 is in the non-high-temperature state).

In particular, for the maps of FIGS. 5 and 6, injection characteristics of intake manifold injector 120 at a high temperature are taken into consideration. More specifically, a maximum value rmax of the DI ratio r is set to ensure that the fuel injection ratio of intake manifold injector 120 is (100−rmax) % at the minimum in injection-shared region 500. Accordingly, it is further ensured to avoid injection of a smaller quantity of fuel by intake manifold injector 120 at a high temperature.

Alternatively, in consideration of the fact that a total fuel injection quantity Qt that is the total quantity of fuel injected by means of injectors 110 and 120 also depends on the engine speed and load factor, mapped values (Di ratio r) in FIGS. 5 and 6 may be designed so that the quantity of fuel injected from intake manifold injector 120 at each mapped point, namely Qt·(100−r) % is at least a predetermined quantity. In this way as well, it can further be ensured to avoid injection of a smaller quantity of fuel by intake manifold injector 120 at a high temperature.

As discussed above, according to the control of the setting of the DI ratio in the present embodiment, the DI ratio can be set to avoid injection of a smaller quantity of fuel due to a marked error in injection quantity (deficient with respect to the set quantity) when intake manifold injector 120 has a high temperature. Accordingly, it can be prevented that variation in output of engine occurs due to an error in quantity of fuel injected by intake manifold injector 120.

It is noted that, in the flowchart shown in FIG. 4, step S100 includes "temperature acquiring means" of the present invention, step S120 corresponds to "first fuel injection ratio setting means" of the present invention and step S130 corresponds to "second fuel injection ratio setting means" of the present invention.

Modification of DI Ratio Setting Maps

Figure 7:
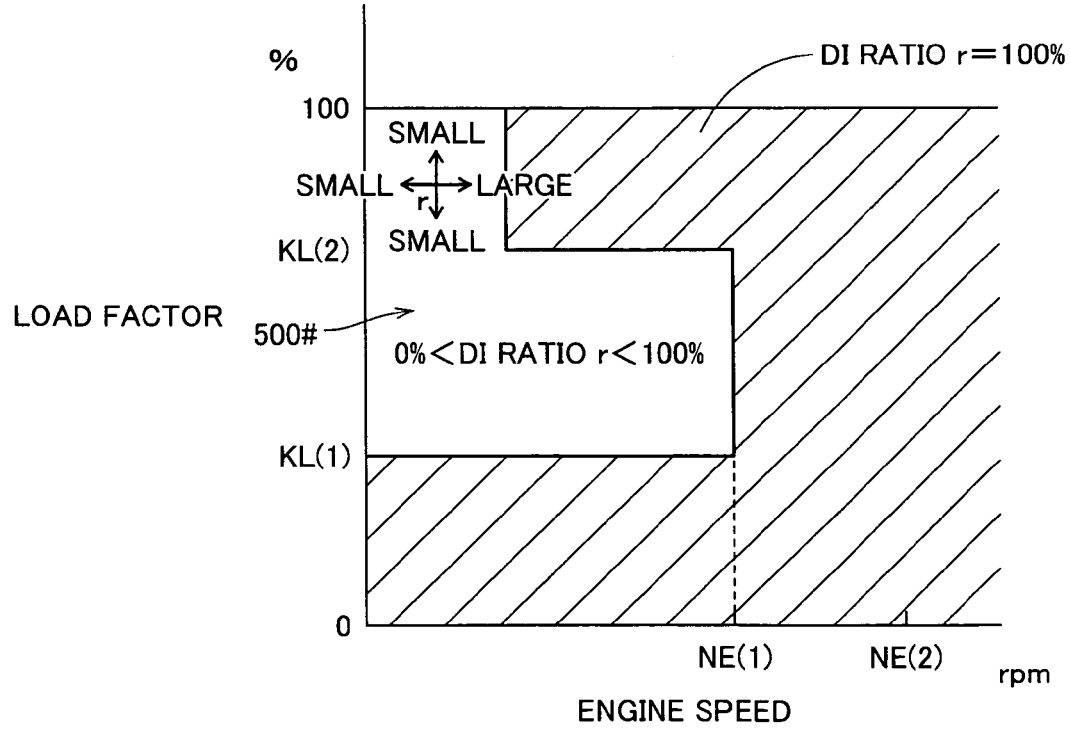
FIG. 7 illustrates a modification of the DI ratio setting map (engine warming time) for a normal state of the engine system shown in FIG. 1.
Figure 8:
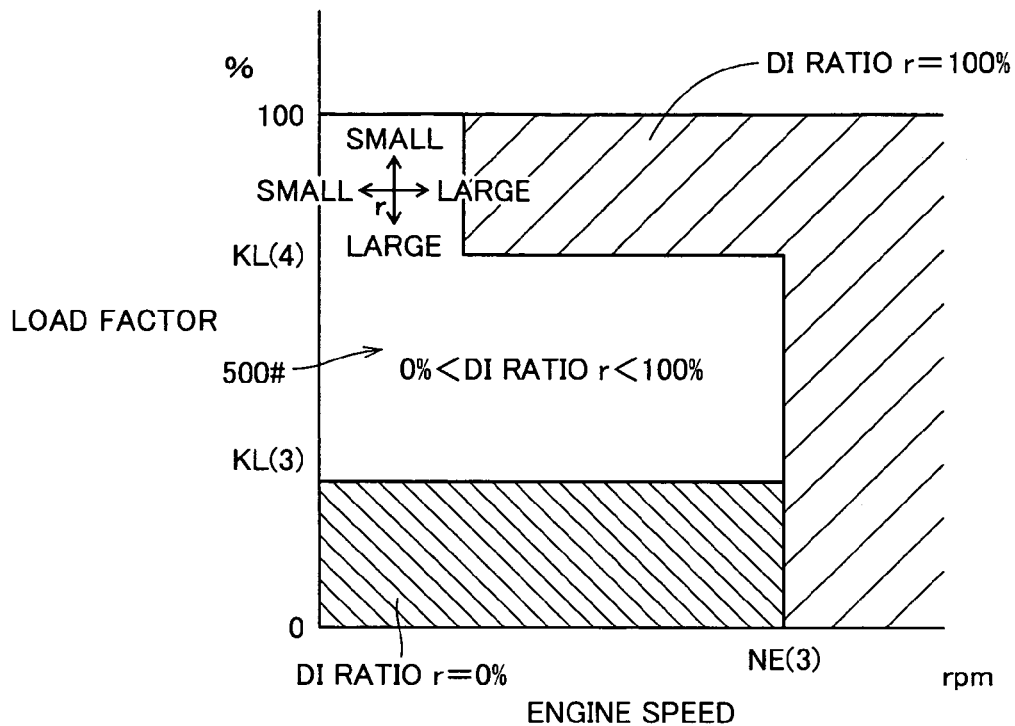
FIG. 8 illustrates a modification of the DI ratio setting map (engine cooling time) for a normal state of the engine system shown in FIG. 1.

FIGS. 7 and 8 show a modification of the maps for setting the DI ratio for the engine system shown in FIG. 1. Namely, in controlling the fuel injection, the maps of FIGS. 7 and 8 may be used instead of the maps shown in FIGS. 2 and 3 and used in a similar manner to that in which the latter maps are used.

The setting maps shown in FIG. 7 (warm state) and FIG. 8 (cold state) differ from the setting maps shown in FIGS. 2 and 3 in terms of the setting of the DI ratio in a high load region in a low engine speed region.

Regarding engine 10, in a high load region in a low engine speed region, mixing of the air-fuel mixture produced by the fuel injected from in-cylinder injector 110 is unsatisfactory, the air-fuel mixture in the combustion chamber is inhomogeneous, and thus combustion tends to unstable. Accordingly, the injection ratio of the in-cylinder injector is set to be higher as the region approaches a higher engine speed region where such a problem does not occur. Further, the injection ratio of the in-cylinder injector is set to be lower as the region approaches a lower load region where such a problem occurs. The changes of the DI ratio are represented by the crisscrossed arrows in FIGS. 7 and 8.

In this manner, variation in output torque of the engine attributable to the unstable combustion can be suppressed. It is noted that the above-described measures are substantially equivalent to the measures to decrease the fuel injection ratio of in-cylinder injector 110 according to transition to a predetermined lower engine-speed region and to increase the fuel injection ratio of in-cylinder injector 110 according to transition to a predetermined lower load region. Further, in a region that is a region other than the region set forth above (the region indicated by the crisscrossed arrows in FIGS. 7 and 8) and that is a region where fuel is injected by only in-cylinder injector 110 (regions of higher engine speed and lower load), the air-fuel mixture can be readily made homogenous even when the fuel is injected using only in-cylinder injector 110. Thus, the fuel injected from in-cylinder injector 110 is vaporized in the combustion chamber involving latent heat of vaporization (by absorbing heat from the combustion chamber). Accordingly, the temperature of the air-fuel mixture is decreased at the compression end. The anti-knock performance is thus improved. Further, since the temperature of the combustion chamber is decreased, intake efficiency is improved and high power output can be accomplished.

The DI ratio setting for other regions in the setting maps shown in FIGS. 7 and 8 is similar to that of FIG. 2 (warm state) and FIG. 3 (cold state). Therefore, the detailed description thereof will not be repeated.

Figure 9:
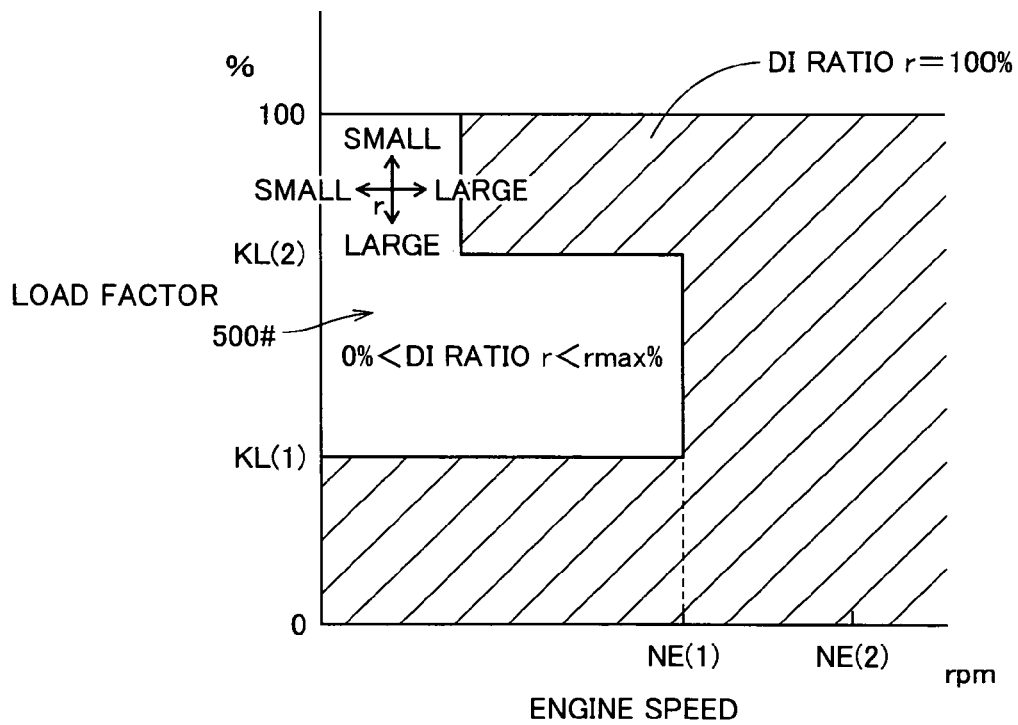
FIG. 9 illustrates a modification of the DI ratio setting map (engine warming time), corresponding to FIG. 7, used when the intake manifold injector has a high temperature.
Figure 10:
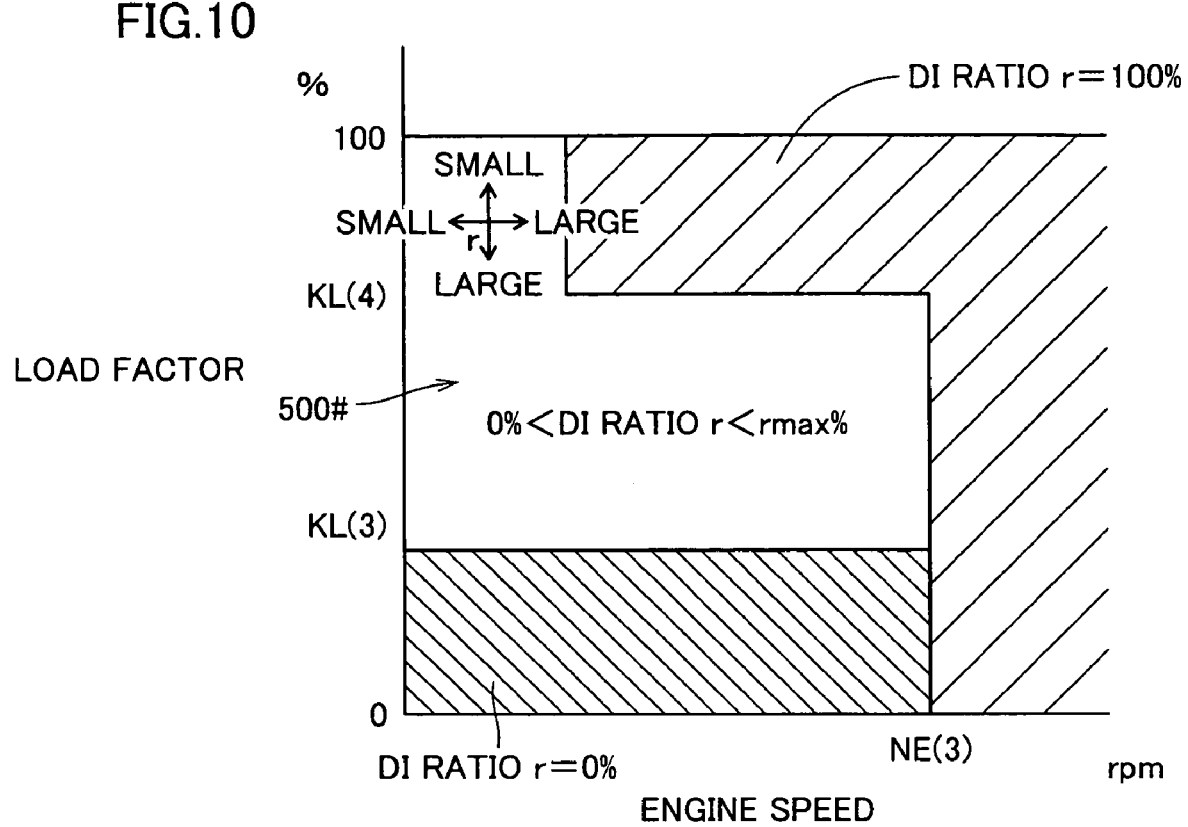
FIG. 10 illustrates a modification of the DI ratio setting map (engine cooling time), corresponding to FIG. 8, used when the intake manifold injector has a high temperature.

FIGS. 9 and 10 show respective DI ratio setting maps that correspond to respective DI ratio setting maps for the normal state as shown in FIGS. 7 and 8 and that are used when intake manifold injector 120 is at a high temperature. Namely, the map shown in FIG. 9 is used when intake manifold injector 120 has a high temperature and the engine is in the warm state, and the map shown in FIG. 10 is used when intake manifold injector 120 has a high temperature and the engine is in the cold state.

The relation between the high-temperature maps shown in FIGS. 9 and 10 and the normal-state maps shown in FIGS. 7 and 8 is similar to the relation as already described between the high-temperature maps in FIGS. 5 and 6 and the normal-state maps in FIGS. 2 and 3, and the detailed description thereof will not be repeated.

For the control of the setting of the DI ratio that follows the flowchart shown in FIG. 4, the high-temperature maps shown in FIGS. 9 and 10 may be used instead of the high-temperature maps shown in FIGS. 5 and 6.

Modification of Control of DI Ratio Setting

Figure 11:
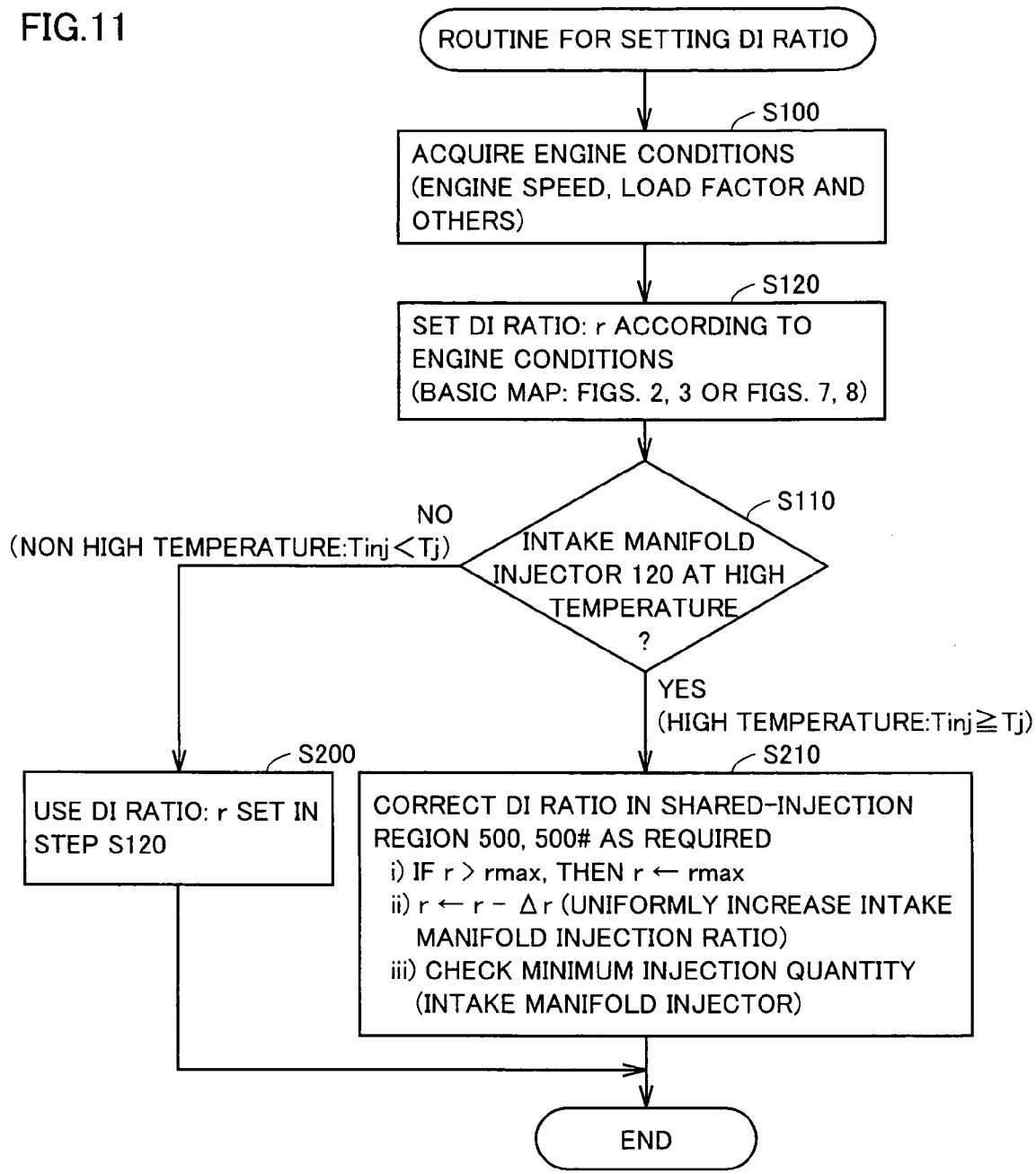
FIG. 11 is a flowchart illustrating a first modification of the control of DI ratio setting by the control apparatus for the internal combustion engine according to the embodiment of the present invention.

FIG. 11 is a flowchart illustrating a first modification of the control of the setting of the DI ratio by the control apparatus for the internal combustion engine according to the embodiment of the present invention.

Referring to FIG. 11, engine ECU 300 acquires conditions of engine 10 (for example, load factor, engine speed and coolant temperature) in step S100 and thereafter sets the DI ratio according to the normal-state maps (FIGS. 2 and 3 or FIGS. 7 and 8) in step S120.

Subsequently, engine ECU 300 in step S110 determines whether or not the temperature Tinj of intake manifold injector 120 is a high temperature.

In the case where it is determined that intake manifold injector 120 is in a normal state (non-high-temperature state (determined as NO in step S110)), engine ECU 300 in step S200 employs the DI ratio r set in step S120 according to the normal-state map.

In contrast, in the case where it is determined that intake manifold injector 120 is in a high-temperature state (determined as YES in step S110), engine ECU 300 in step S210 sets the DI ratio so that the quantity of fuel injected to the intake manifold is increased as compared with the normal one. Specifically, for DI ratio r ≠0%, 100%, namely for shared injection region 500, the DI ratio r set in step S120 is corrected as required.

For example, a maximum value rmax of the DI ratio r in the shared-injection region (namely a minimum value of the ratio of fuel injection by intake manifold injector 120) is set and, if the DI ratio r that is set in step S120 is higher than rmax, an operation for correcting the ratio to r=rmax may be performed in step S210. Alternatively, from the DI ratio r set in step S120, Δr may be uniformly subtracted in step S210 so as to uniformly increase the ratio of fuel injection by intake manifold injector 120.

Still alternatively, an operation may be performed in step S210 to provide a guard so that fuel injection quantity Qp from intake manifold injector 120 according to the DI ratio r set in step S120, namely Qp=Qt·(100−rmax) %, is at least a predetermined quantity. In this case, if fuel injection quantity Qpi is less than a guard value Qpmin, fuel injection quantity Qp may be forcedly corrected to Qpmin (Qp←Qpmin) and the fuel injection quantity Qt from in-cylinder injector 110 is also corrected to Qt−Qpmin. It is noted that the guard value Qpmin is set in advance in a region where a marked error in injection quantity (deficient with respect to the set quantity) does not occur when intake manifold injector 120 has a high temperature.

With the above-described control of the setting of the DI ratio as well, the DI ratio can be set to avoid injection of a smaller quantity of fuel due to a marked error in injection quantity (deficient with respect to the set quantity) when intake manifold injector 120 has a high temperature. Accordingly, it can be prevented that variation in output of the engine occurs due to an error in fuel injection quantity of intake manifold injector 120.

According to the control of the setting of the DI ratio as shown in FIG. 11, while the complexity of the operation in step S210 increases as compared with the operation that is performed with reference to the maps, it is unnecessary to have two different DI ratio setting maps, namely the map for a normal state and the map for a high-temperature state of intake manifold injector 120. Thus, the map-storing memory in engine ECU 300 can be reduced in size.

Figure 12:
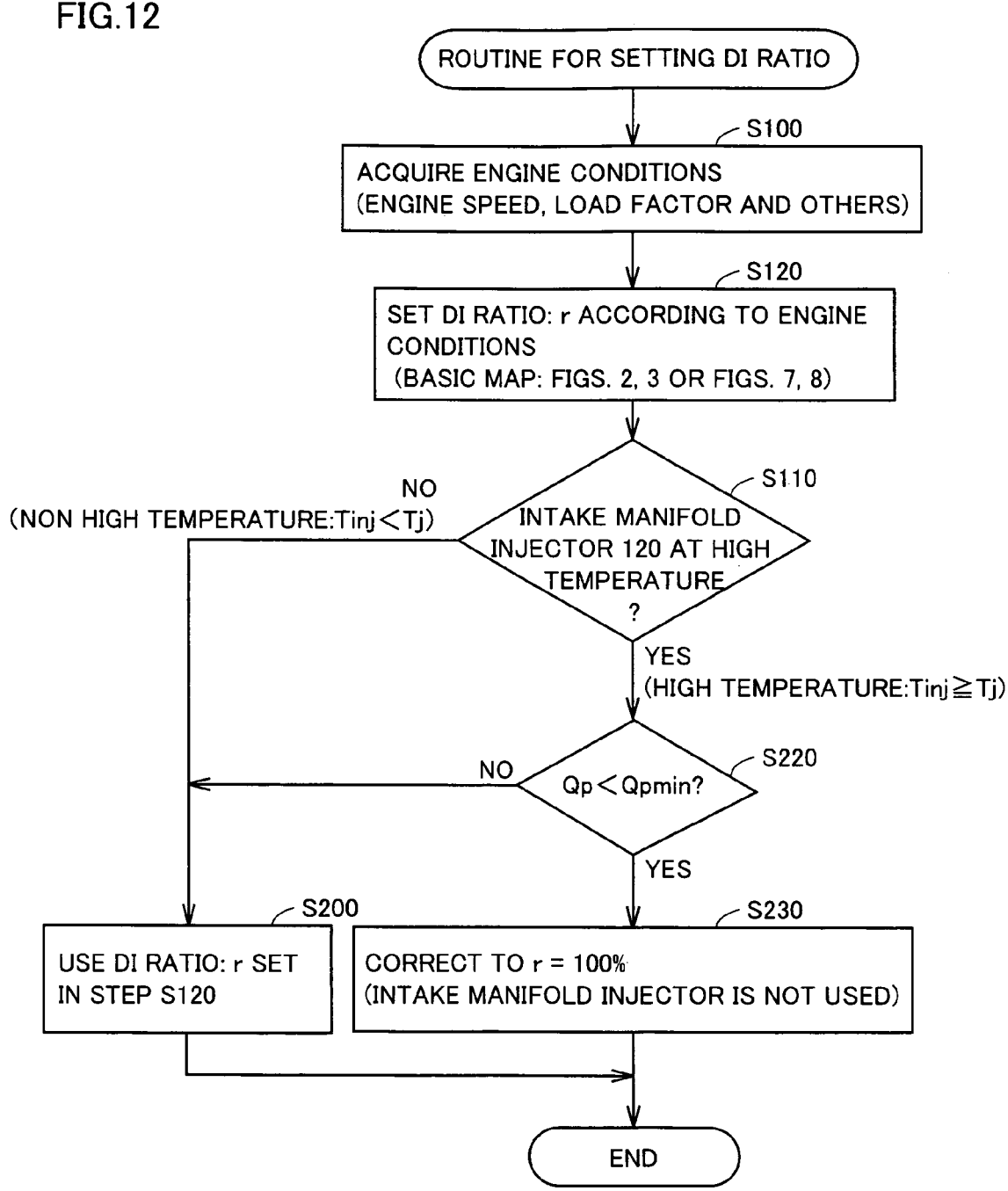
FIG. 12 is a flowchart illustrating a second modification of the control of DI ratio setting by the control apparatus for the internal combustion engine according to the embodiment of the present invention.

FIG. 12 is a flowchart illustrating a second modification of the control of the setting of the DI ratio by the control apparatus for the internal combustion engine according to the embodiment of the present invention.

The flowchart shown in FIG. 12 differs from the flowchart shown in FIG. 11 in that steps S220 and S230 are performed in the former, instead of steps S210.

In the case where engine ECU 300 determines that intake manifold injector 120 is in a high temperature state (determined as YES in step S110), engine ECU 300 in step S220 determines whether or not the fuel injection quantity Qp from intake manifold injector 120 is at least a predetermined quantity. Specifically, it is determined whether or not the fuel injection quantity Qp is less than the guard value Qpmin.

In the case where the fuel injection quantity from intake manifold injector 120 is at least the predetermined quantity according to the DI ratio r set in step S120 (NO in step S220), engine ECU 300 in step S200 employs the DI ratio r that is set in step S120 according to the normal-state map.

In contrast, if the fuel injection quantity from intake manifold injector 120 is very small (YES in step S220), engine ECU 300 in step S230 corrects the DI ratio to r=100%. Accordingly, intake manifold injector 120 that could cause a pronounced error in injection quantity (deficient with respect to the set quantity) is not used and, the total fuel injection quantity Qt of injectors 110 and 120 is injected from in-cylinder injector 110.

With this control of the setting of the DI ratio as well, the DI ratio can be set to avoid injection of a smaller quantity of fuel due to a pronounced error in fuel injection quantity (deficient with respect to the set quantity) when intake manifold injector 120 has a high temperature.

It is noted that, in the flowchart shown in FIG. 11, steps S120, S200 correspond to "first fuel injection ratio setting means" of the present invention and step S210 corresponds to "second fuel injection ratio setting means" of the present invention. Further, in the flowchart shown in FIG. 12, steps S120, S200 corresponds to "first fuel injection control means" of the present invention and step S210 corresponds to "second fuel injection control means" of the present invention.

Here, preferred fuel injection of engine 10 described in connection with the present embodiment will further be described.

In engine 10, homogeneous combustion can be realized by setting the fuel injection timing of in-cylinder injector 110 in the intake stroke, while stratified charge combustion can be realized by setting the fuel injection timing in the compression stroke. That is, the fuel injection timing of in-cylinder injector 110 is set in the compression stroke, so that a rich air-fuel mixture can be located locally around the spark plug and a lean air-fuel mixture in totality can be ignited in the combustion chamber to realize the stratified charge combustion. Even if the fuel injection timing of in-cylinder injector 110 is set in the intake stroke, the stratified charge combustion can be realized under the condition that a rich air-fuel mixture can be located locally around the spark plug.

As used herein, the stratified charge combustion includes both the stratified charge combustion and semi-stratified charge combustion as set forth below. In the semi-stratified charge combustion, intake manifold injector 120 injects fuel in the intake stroke to generate a lean and homogeneous air-fuel mixture in totality in the combustion chamber, and then in-cylinder injector 10 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idling state) so as to cause a high-temperature combustion gas to arrive at the catalyst. Further, a certain quantity of fuel must be supplied. If it is tried to satisfy these requirements by the stratified charge combustion, the problem is that the quantity of fuel is insufficient. If it is tried to satisfy the requirements by the homogeneous combustion, the problem is that the retarded amount for the purpose of maintaining favorable combustion is small as compared to the stratified charge combustion. For these reasons, the above-described semi-stratified charge combustion is preferably employed in the catalyst warm-up operation, although either of stratified charge combustion and semi-stratified charge combustion may be employed.

Further, in engine 10, the fuel injection timing by in-cylinder injector 110 is preferably set in the compression stroke for the reason set forth below. It is to be noted that, for most of the fundamental region (here, the fundamental region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state), the fuel injection timing of in-cylinder injector 110 is set in the intake stroke. The fuel injection timing of in-cylinder injector 110, however, may be set temporarily in the compression stroke for the purpose of stabilizing combustion, as will be described hereinafter.

When the fuel injection timing of in-cylinder injector 110 is set in the compression stroke, the air-fuel mixture is cooled by the fuel injection during the period where the temperature in the cylinder is relatively high. This improves the cooling effect and, hence, the anti-knock performance. Further, when the fuel injection timing of in-cylinder injector 110 is set in the compression stroke, the time required starting from fuel injection up to the ignition is short, so that the air current can be enhanced by the atomization, leading to an increase of the combustion rate. With the improvement of anti-knock performance and the increase of combustion rate, variation in combustion can be avoided to improve combustion stability.

Further, regardless of the temperature of engine 10 (namely in either of the warm state and the cold state), the DI ratio map for the warm state shown in FIG. 2 or 7 may be employed in an off-idle mode (in the case where the idle switch is off, in the case where the accelerator pedal is depressed; namely in-cylinder injector 110 is used in a low load region regardless of the warm state and cold state).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine having first fuel injection means for injecting fuel into a cylinder and second fuel injection means for injecting fuel into an intake manifold, said control apparatus comprising:
   temperature acquiring means for acquiring temperature of said second fuel injection means; and
   fuel injection control means for controlling, based on a state of said internal combustion engine, a required total quantity of fuel to be injected as well as a fuel injection ratio between a quantity of fuel to be injected from said first fuel injection means and a quantity of fuel to be injected from said second fuel injection means, wherein
   said fuel injection control means includes
   first fuel injection ratio setting means for setting, when the temperature of said second fuel injection means is lower than a predetermined temperature, said fuel injection ratio based on the state of said internal combustion engine, and
   second fuel injection ratio setting means for setting, when the temperature of said second fuel injection means is at least the predetermined temperature, said fuel injection ratio based on the state of said internal combustion engine, and
   said second fuel injection ratio setting means sets said fuel injection ratio based on a state of said internal combustion engine so that a quantity of fuel to be injected into the intake manifold by said second fuel injection means is at least a quantity of fuel to be injected into the intake manifold that is determined in accordance with said fuel injection ratio which is set based on the same state of said internal combustion engine by said first fuel injection ratio setting means.

2. The control apparatus for the internal combustion engine according to claim 1, wherein
   said second fuel injection ratio setting means sets said fuel injection ratio so that a ratio of fuel injection by said second fuel injection means is larger than a predetermined value.

3. The control apparatus for the internal combustion engine according to claim 1, wherein
   said second fuel injection ratio setting means sets said fuel injection ratio so that the quantity of fuel to be injected from said second fuel injection means is larger than a predetermined quantity.

4. The control apparatus for the internal combustion engine according to claim 1, wherein
   for a region corresponding to a state of said internal combustion engine where fuel is injected by means of both of said first and second fuel injection means, a minimum value of a ratio of fuel injection by said second fuel injection means that is determined in accordance with said fuel injection ratio which is set by said second fuel injection ratio setting means is larger than a minimum value of a ratio of fuel injection by said second fuel injection means that is determined in accordance with said fuel injection ratio which is set by said first fuel injection ratio setting means.

5. A control apparatus for an internal combustion engine having first fuel injection means for injecting fuel into a cylinder and second fuel injection means for injecting fuel into an intake manifold, said control apparatus comprising:
   temperature acquiring means for acquiring temperature of said second fuel injection means;
   first fuel injection control means for controlling, based on a state of said internal combustion engine, a required total quantity of fuel to be injected as well as a fuel injection ratio between a quantity of fuel to be injected from said first fuel injection means and a quantity of fuel to be injected from said second fuel injection means; and
   second fuel injection control means for controlling said fuel injection ratio so that said total quantity of fuel to be injected is injected from said first fuel injection means, when the temperature of said second fuel injection means is at least a predetermined temperature and said internal combustion engine is in a region corresponding to an operation state where a quantity of fuel that is to be injected from said second fuel injection means and that is set by said first fuel injection control means is at most a predetermined quantity.

6. A control apparatus for an internal combustion engine having a first fuel injection mechanism for injecting fuel into a cylinder and a second fuel injection mechanism for injecting fuel into an intake manifold, said control apparatus comprising:
   a temperature acquiring portion configured to acquire temperature of said second fuel injection mechanism; and
   a fuel injection control portion configured to control, based on a state of said internal combustion engine, a required total quantity of fuel to be injected as well as a fuel injection ratio between a quantity of fuel to be injected from said first fuel injection mechanism and a quantity of fuel to be injected from said second fuel injection mechanism, wherein
   said fuel injection control portion includes
   a first fuel injection ratio setting portion configured to set, when the temperature of said second fuel injection mechanism is lower than a predetermined temperature, said fuel injection ratio based on the state of said internal combustion engine, and
   a second fuel injection ratio setting portion configured to set, when the temperature of said second fuel injection mechanism is at least the predetermined temperature, said fuel injection ratio based on the state of said internal combustion engine, and
   said second fuel injection ratio setting portion is configured to set said fuel injection ratio based on a state of said internal combustion engine so that a quantity of fuel to be injected into the intake manifold by said second fuel injection mechanism is at least a quantity of fuel to be injected into the intake manifold that is determined in accordance with said fuel injection ratio which is set based on the same state of said internal combustion engine by said first fuel injection ratio setting portion.

7. The control apparatus for the internal combustion engine according to claim 6, wherein
said second fuel injection ratio setting portion is configured to set said fuel injection ratio so that a ratio of fuel injection by said second fuel injection mechanism is larger than a predetermined value.

8. The control apparatus for the internal combustion engine according to claim 6, wherein
said second fuel injection ratio setting portion is configured to set said fuel injection ratio so that the quantity of fuel to be injected from said second fuel injection mechanism is larger than a predetermined quantity.

9. The control apparatus for the internal combustion engine according to claim 6, wherein
for a region corresponding to a state of said internal combustion engine where fuel is injected by means of both of said first and second fuel injection mechanisms, a minimum value of a ratio of fuel injection by said second fuel injection mechanism that is determined in accordance with said fuel injection ratio which is set by said second fuel injection ratio setting portion is larger than a minimum value of a ratio of fuel injection by said second fuel injection mechanism that is determined in accordance with said fuel injection ratio which is set by said first fuel injection ratio setting portion.

10. A control apparatus for an internal combustion engine having a first fuel injection mechanism for injecting fuel into a cylinder and a second fuel injection mechanism for injecting fuel into an intake manifold, said control apparatus comprising:
a temperature acquiring portion configured to acquire temperature of said second fuel injection mechanism;
a first fuel injection control portion configured to control, based on a state of said internal combustion engine, a required total quantity of fuel to be injected as well as a fuel injection ratio between a quantity of fuel to be injected from said first fuel injection mechanism and a quantity of fuel to be injected from said second fuel injection mechanism; and
a second fuel injection control portion configured to control said fuel injection ratio so that said total quantity of fuel to be injected is injected from said first fuel injection mechanism, when the temperature of said second fuel injection mechanism is at least a predetermined temperature and said internal combustion engine is in a region of a state where a quantity of fuel that is to be injected from said second fuel injection mechanism and that is set by said first fuel injection control portion is at most a predetermined quantity.

11. An engine system comprising:
an internal combustion engine having a first fuel injection mechanism for injecting fuel into a cylinder and a second fuel injection mechanism for injecting fuel into an intake manifold; and
a control apparatus controlling said internal combustion engine, wherein
said control apparatus acquires temperature of said second fuel injection mechanism, and controls, based on a state of said internal combustion engine, a required total quantity of fuel to be injected as well as a fuel injection ratio between a quantity of fuel to be injected from said first fuel injection mechanism and a quantity of fuel to be injected from said second fuel injection mechanism, and
said control apparatus further sets said fuel injection ratio based on a state of said internal combustion engine, when the temperature of said second fuel injection mechanism is at most a predetermined temperature, so that a quantity of fuel to be injected into the intake manifold by said second fuel injection mechanism is at least a quantity of fuel that is to be injected into the intake manifold and that is determined in accordance with said fuel injection ratio which is set based on the same state of said internal combustion engine when the temperature of said second fuel injection mechanism is lower than the predetermined temperature.

12. An engine system comprising:
an internal combustion engine having a first fuel injection mechanism for injecting fuel into a cylinder and a second fuel injection mechanism for injecting fuel into an intake manifold; and
a control apparatus controlling said internal combustion engine, wherein
said control apparatus acquires temperature of said second fuel injection mechanism, and controls, based on a state of said internal combustion engine, a required total quantity of fuel to be injected as well as a fuel injection ratio between a quantity of fuel to be injected from said first fuel injection mechanism and a quantity of fuel to be injected from said second fuel injection mechanism, and
said control apparatus further controls said fuel injection ratio so that said total quantity of fuel to be injected is injected from said first fuel injection mechanism when the temperature of said second fuel injection mechanism is at least a predetermined temperature, under the condition that said internal combustion engine is in a region of an operating state where a quantity of fuel to be injected from said second fuel injection mechanism is at most a predetermined quantity when the temperature of said second fuel injection mechanism is lower than said predetermined temperature.

* * * * *